United States Patent [19]

Gardner et al.

[11] 3,792,257

[45] Feb. 12, 1974

[54] LATERAL PHOTODETECTORS

[75] Inventors: Keith L. Gardner, Los Angeles; Kenneth B. La Baw, China Lake, both of Calif.

[73] Assignee: The United States of America as represented by the Secretary of the Navy, Washington, D.C.

[22] Filed: Mar. 31, 1972

[21] Appl. No.: 240,109

[52] U.S. Cl. .......................... 250/211 J, 317/223 N

[51] Int. Cl. .......................... H01i 15/00

[58] Field of Search... 250/211 J, 211 K; 317/235 N

[56] References Cited

UNITED STATES PATENTS

| | | | |
|---|---|---|---|
| 3,351,493 | 11/1967 | Weiman et al. | 250/211 J X |
| 3,087,069 | 4/1963 | Moncrieff-Yeates | 250/211 K |
| 3,689,900 | 9/1972 | Chen | 317/235 N |
| 3,028,500 | 4/1962 | Wallmark | 250/211 J |

*Primary Examiner*—Walter Stolwein
*Attorney, Agent, or Firm*—R. S. Sciascia; Roy Miller; R. W. Adams

[57] ABSTRACT

Lateral photodetectors modified such that the resistivity of the photodetector wafer is selectively varied as a function of lateral position to achieve X, Y linearity (rectilinearity).

5 Claims, 6 Drawing Figures

LATERAL PHOTODETECTORS

BACKGROUND OF THE INVENTION

Among other position sensing uses, lateral photodetectors operated in the photoconductive mode may be used in a system to track the aim direction of a pilot's helmet, such as the system disclosed in U.S. Pat. No. 3,678,283, entitled Optical Tracker, by Kenneth B. LaBaw. For the helmet tracking application the photodetector is used behind a lens to determine angles in the object space of the lens. Since lines of constant space angle are not necessarily straight lines in the image plane then the goal of controlling the photodetector output function is directed to some nonlinear functions as well as linear.

The photodetecting device depends upon a Schottky barrier region produced by a gold film deposited on a thin silicon wafer. Ohmic contacts are placed on the backside near the edge of the wafer. An example of a square configuration is shown in FIG. 1.

Electron-hole pairs generated by photons in the barrier region are separated by the barrier field. A reverse bias is supplied to the junction through the gold film and the back contacts. Holes swept to the gold film are quickly annihilated. The electrons swept to the bulk silicon have a high resistance path to the back contacts. The same effects can be produced with a P-N junction. It is the path differences to the contacts that provide different currents to the contacts. Current differences at the back electrodes are functions of the lateral position of the light spot that generates carriers.

By determining the relationship between the current differences from the back contacts and the lateral position of the carrier generating light spot it is discovered that the contact outputs are not linear functions of the lateral position. More generally, as applied to a two dimensional area, the contact coutputs are not rectilinear functions of the lateral position. Ideally, the position of the light spot on the detector is defined by measuring the current differences between opposing contacts. FIG. 2 is a graph of the voltage difference $V_x$ of two opposing contacts of a typical lateral photodiode, in this case the x-axis contacts, against x. As can be seen, the voltage difference $V_x$ at $X = 0$ is zero for all values of $y$. The voltage difference $V_x$ at $x = -0.4$ is approximately $-0.575$ for $Y = 0$; but, is approximately 0.2 for $Y = -0.48$. It is, therefore, evident that the response is not rectilinear. If it were rectilinear, the voltage difference $V_x$ would be independent of $y$ and would plot as a straight line. The present invention offers improvement of lateral photodetectors by providing four methods and means for linearizing the detector response.

Prior devices or methods for modifying the detector photoconductive mode response were to alter the photodetectors configuration or add external electronics for shaping the output. The present invention is a technique which provides a greater control of linearity than the prior devices or methods. Additionally, the present invention provides a device which has a greater degree of sensitivity and linearity than the devices which include external electronics, which is important in systems such as the above-mentioned Optical Tracker.

DESCRIPTION OF THE PREFERRED EMBODIMENTS

Figure 2:
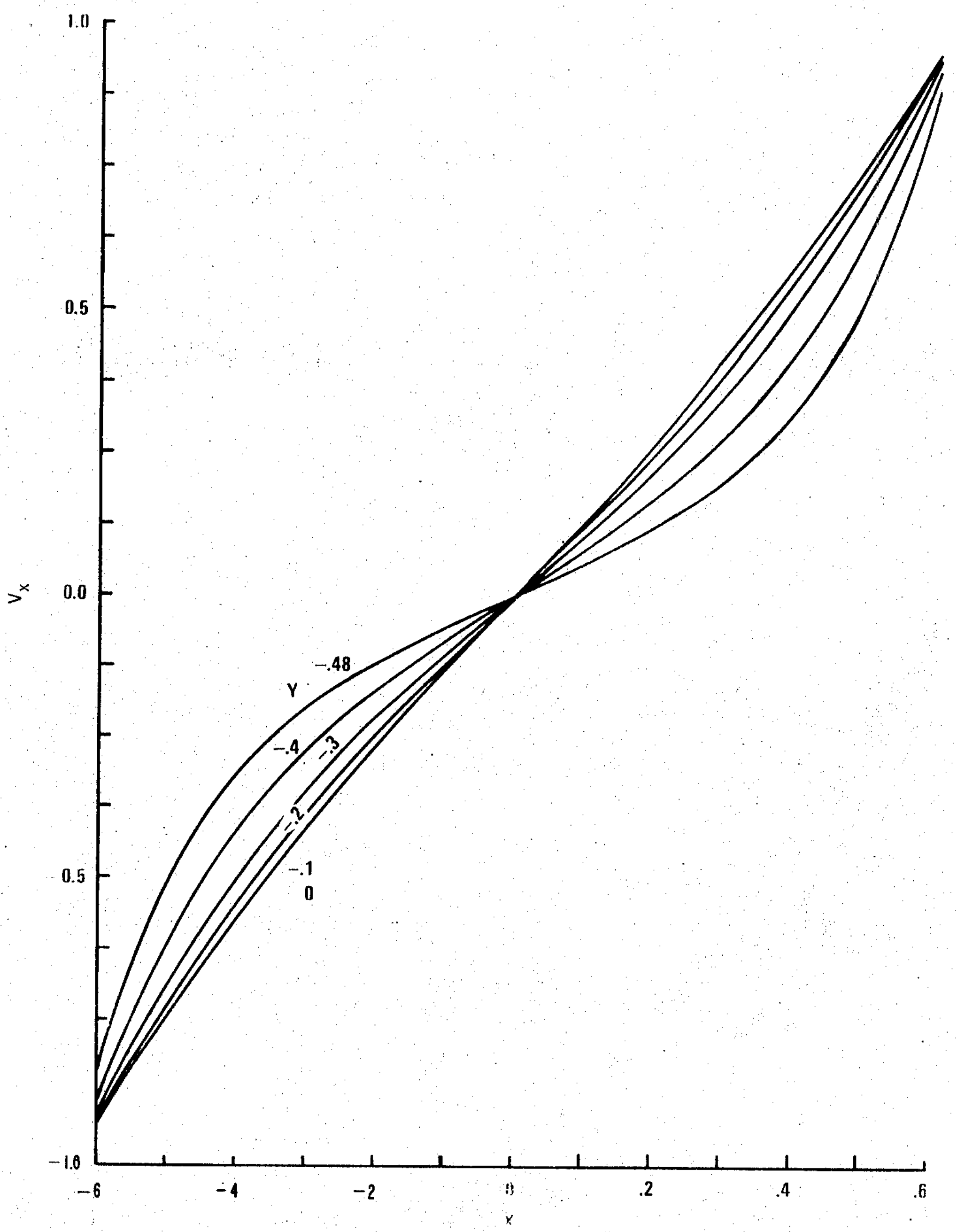
FIG. 2 is a graph of the response of an unmodified lateral photodetector showing the voltage difference between opposing contacts for various values of $x$ and $y$.
Figure 1:
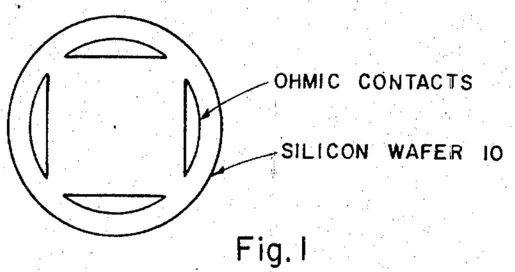
FIG. 1 is a plan view of an unmodified lateral photodetector showing four ohmic contacts.

A typical, readily available, lateral photodetector is shown in FIG. 1. FIG. 2 shows a typical nonlinear response curve of the unmodified photodetector.

A problem encountered in the development of position sensing devices is that the lateral photodetectors, or photodetectors presently available, are nonlinear. That is, the output of the detectors are not linear functions of the $x$, $y$ position of the light spot projected onto the detectors receiving surface. This nonlinearity is due mainly to the configuration of the sensing electrodes, generally square, on the back surface of the silicon wafer. And, to a lesser extent, due to impurities in the silicon and the nonideal nature of the detector components.

As the present invention discloses, by varying the resistivity of the wafer selectively as a function of lateral position it is possible to achieve X, Y linearity, or any desired nonlinearity. Four examples of the present invention are included to teach the approach contemplated for controlling the linearity of lateral photodetectors.

Figure 3:
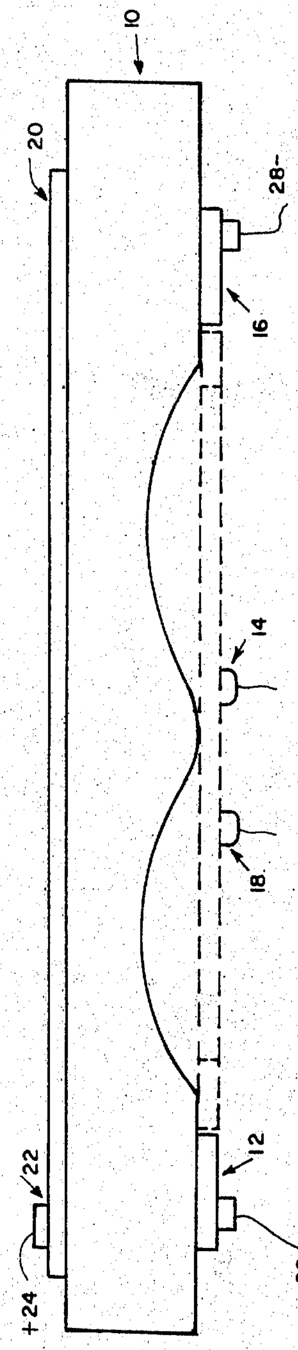
FIG. 3 is a sectional, plan view of an embodiment of the present invention wherein the response is linearized by selectively eliminating portions of the silicon wafer.

The first example is to vary the thickness of the silicon wafer. A linear response is achieved using this approach by cutting the rear surface of the wafer to the desired contour (FIG. 3). Using this example, the effective two-dimensional resistivity of the wafer at any $x$, $y$ position becomes an inverse function of the thickness of the wafer in the vicinity of that position.

Figure 4:
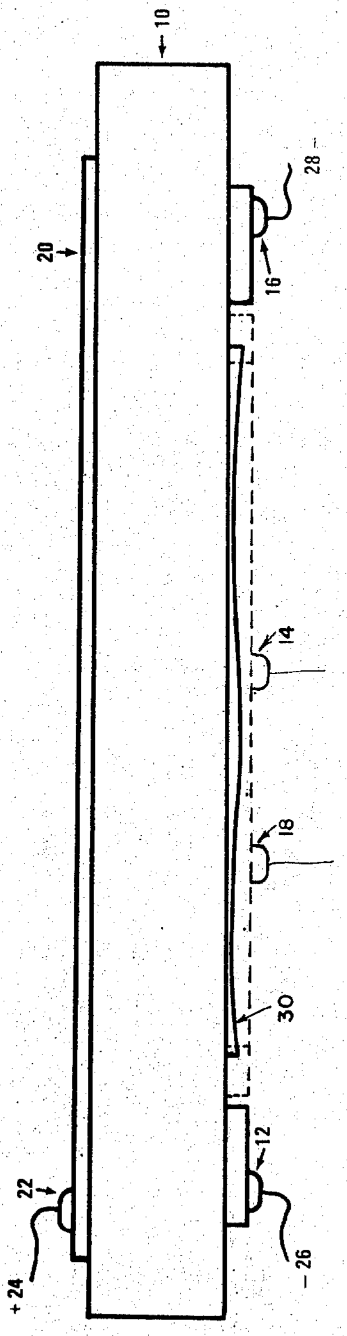
FIG. 4 is a sectional, plan view of another embodiment of the present invention showing the addition of conductive or resistive material to the wafer.

The second example for achieving a linear response is to deposit material of varying degrees of resistivity or conductivity on the rear surface of the wafer (FIG. 4). This approach, as in the first example, alters the resistive paths available to the charge carriers, which selectively alters the paths and achieves the desired results of linearity.

Figure 5:
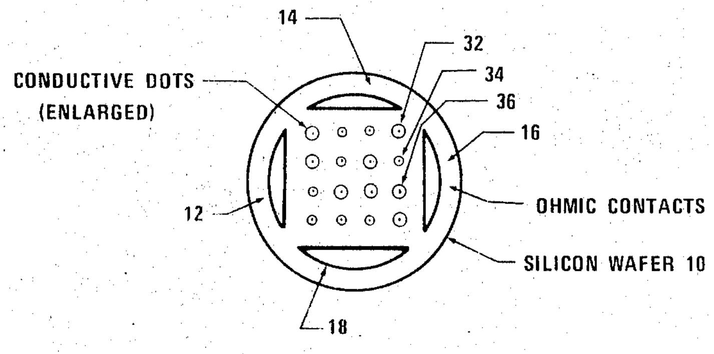
FIG. 5 is a plan view of another embodiment of the present invention wherein conductive dots are added to the surface of the wafer between the contacts.

The third example for achieving linearity is to imprint a number of dots of a conductor such as gold onto the rear surface of the wafer, i.e., between the contacts, (FIG. 5). The dots provide low resistance paths to the contacts. The effective two-dimensional resistivity of the wafer at each point would be determined by the density or the size of the conductive dots in the vicinity of that coordinate. The dots could be placed on the surface by evaporative techniques with suitable masks. Alternatively, photographic techniques, such as those used to construct a newspaper picture, could be used to print the dots.

Figure 6:
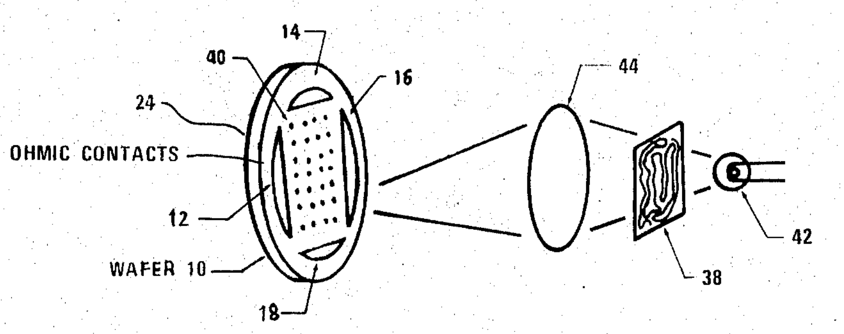
FIG. 6 is a plan view of another embodiment of the present invention wherein Schottky barrier regions are formed on the surface of the wafer between the contacts and selectively illuminated.

The fourth example again uses conductive dots to achieve a linear response (FIG. 6). The dots of a conductor such as gold are applied to the rear surface in such a manner as to form a Schottky barrier between each dot and the silicon wafer. The front surface of many typical lateral photodetectors form Schottky barriers between the conductive surface and the silicon wafer. The same techniques may be used to apply the conductive dots to the rear surface. The lateral resistivity function is varied by illuminating the dotted surface. The greater the light intensity on a dot the lower the effective resistance in that area. Thereby, by controlling the light intensity striking each area the resistivity of the photodetector can be controlled and made linear. One method of controlling the light intensity is to use a light mask of laterally varying transparencies between the illumination source and the rear surface.

The device of FIG. 3 operates as follows:

When surface 20 is not illuminated the resistances between contact 22 and contacts 12, 14, 16, and 18 are maximum. When surface 20 becomes illuminated the reaction discussed in the Background of the Invention (above) results and the resistances between contact 22 and contacts 12, 14, 16, and 18 are reduced, causing more current to flow through lead 24, contacts 12, 14, 16, and 18 and their respective leads 26, 28, and the leads connected to contacts 14 and 18. Ideally, the amount by which the current through each contact 12, 14, 16, and 18 is increased, is directly proportional to its nearness to the area on surface 20 which receives the greatest amount of radiant energy. By selectively eliminating portions of wafer 10 FIG. 3) the inherent nonrectilinear resistivity between contact 22 and contacts 12, 14, 16, and 18 is made more rectilinear. As a result, the resistivity, i.e., resistance per unit specimen, seen by the electron of the electron of the electron-hole pair generated by a photon is the same looking toward contacts 12, 14, 16, or 18. The resistance to each contact is, of course, dependent on the distance the electron is from that contact.

The device of FIG. 4 operates as follows:

The electron of the electron-hole pair generated by a photon, like above, sees the same resistivity looking toward contacts 12, 14, 16, or 18. Rectilinearity is accomplished in this embodiment through modification of the resistivity from that of the typical lateral photodetector by the selective addition of conductive material, i.e., material more conductive than the wafer material, to the surface of the wafer between contacts 12, 14, 16, and 18. As a result, the electron which previously would have seen a high resistance path to, for example, contact 12 now sees a somewhat reduced resistance path through wafer 10 and selectively deposited conductive material 30.

The device of FIG. 5 operates as follows: Like above, the electron sees the same resistivity looking toward contacts 12, 14, 15, or 18. Rectilinearity is accomplished in this embodiment through modification of the resistivity by the addition of conductive dots to the surface of the wafer between contacts 12, 14, 16, and 18. The dots, for example, may be uniform in size and irregularly spaced; ununiform in size and having their centers regularly spaced such as dots 32, 34, and 36; or any combination thereof to achieve the desired result. The device of FIG. 5 provides a less resistive path through wafer 10 and the conductive dots to, for example, contact 12 than does the unmodified lateral photodiode.

The device of FIG. 6 operates as follows: Schottky barrier dots 40 are deposited on the surface of wafer 10 between contacts 12 – 18 by any appropriate technique, such as the technique used to deposit the gold material on the irradiated surface of wafer 10. A preselected, laterally varying masking means 38, consisting of, for example, a photographic negative, is positioned between illumination source and wafer 10 including dots 40. The mask, or negative, includes a pattern preselected by, such as, computer analysis to alter the performance of the photodetector to achieve any desired result. When the exposed Schottky barrier dots 40 are illuminated through mask 38 and focusing optics 44 by illumination source 42 a conductive path through the exposed dots is provided. As a result, the electron sees a reduced resistance path through wafer 10 and the exposed Schottky barrier dots to, for example, contact 12.

What is claimed is:

1. A lateral photodetector having a radiation sensitive surface and a plurality of regularly spaced ohmic contacts wherein said contacts lie in a plane substantially parallel to the sensitive surface and the contacts and the sensitive surface are separated by a semiconductive material, including means for varying the resistivity of the semiconductor material as a function of lateral position such that the resistance between any contact and any point on said surface is a rectilinear function, wherein said varying means includes a plurality of conductive dots attached to the surface of the semiconductive material nearest the contacts and positioned between the contacts.

2. The photodetector of claim 1 wherein said conductive dots are uniformly spaced and ununiform in size.

3. The photodetector of claim 1 wherein said conductive dots are uniform in size and ununiformly spaced.

4. A lateral photodetector having a radiation sensitive surface and a plurality of regularly spaced ohmic contacts wherein said contacts lie in a plane substantially parallel to the sensitive surface and the contacts and the sensitive surface are separated by a semiconductive material, including means for varying the resistivity of the semiconductor material as a function of lateral position such that the resistance between any contact and any point on said surface is a rectilinear function, wherein said varying means includes uniformly spaced Schottky barrier dots attached to the surface of said semiconductive material between said contacts, an illumination source, and a masking means positioned between the illumination source and the photodetector for causing said dots to be selectively illuminated.

5. The photodetector of claim 4 wherein said masking means is a photographic negative.

* * * * *